US009071172B2

(12) United States Patent
Brown et al.

(10) Patent No.: US 9,071,172 B2
(45) Date of Patent: Jun. 30, 2015

(54) SINE MODIFIED TRAPEZOIDAL DRIVE FOR BRUSHLESS DC MOTORS

(71) Applicant: Microchip Technology Incorporated, Chandler, AZ (US)

(72) Inventors: Ward R. Brown, Chandler, AZ (US); Howard F. Hendricks, Prescott, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 145 days.

(21) Appl. No.: 13/959,543

(22) Filed: Aug. 5, 2013

(65) Prior Publication Data

US 2014/0265967 A1   Sep. 18, 2014

Related U.S. Application Data

(60) Provisional application No. 61/784,606, filed on Mar. 14, 2013.

(51) Int. Cl.
*H02P 6/14*   (2006.01)
*H02P 7/00*   (2006.01)
*H02P 6/18*   (2006.01)

(52) U.S. Cl.
CPC  *H02P 7/00* (2013.01); *H02P 6/182* (2013.01); *H02P 2209/07* (2013.01)

(58) Field of Classification Search
CPC ............................ H02P 2209/07; H02P 6/182
USPC ....................................................... 318/400.27
See application file for complete search history.

(56) References Cited

U.S. PATENT DOCUMENTS

| | | | | | |
|---|---|---|---|---|---|
| 5,440,219 | A | * | 8/1995 | Wilkerson | 318/802 |
| 6,118,680 | A | * | 9/2000 | Wallace et al. | 363/71 |
| 6,388,416 | B1 | * | 5/2002 | Nakatani et al. | 318/700 |
| 2010/0315029 | A1 | * | 12/2010 | Kern et al. | 318/400.13 |
| 2013/0307447 | A1 | * | 11/2013 | Rozman et al. | 318/400.02 |
| 2014/0042943 | A1 | * | 2/2014 | Qin et al. | 318/400.34 |

\* cited by examiner

*Primary Examiner* — Erick Glass
(74) *Attorney, Agent, or Firm* — Slayden Grubert Beard PLLC

(57) ABSTRACT

A pulse width modulated (PWM) trapezoidal commutation drive to a brushless direct current (BLDC) motor is sine modified so that the applied drive voltage substantially matches the induced voltage generated in the BLDC motor. The values of the cosine of the angles between −30 degrees and +30 degrees are used to modify the duty cycle of the PWM drive signal dependent upon the rotor angular positions determined from the times between the zero crossing BEMF voltages measured at the unconnected motor terminals.

19 Claims, 7 Drawing Sheets

Motor Coils In DELTA Configuration

Motor Coils In WYE Configuration

SINE MODIFIED TRAPEZOIDAL DRIVE FOR BRUSHLESS DC MOTORS

RELATED PATENT APPLICATION

This application claims priority to commonly owned U.S. Provisional Patent Application Ser. No. 61/784,606; filed Mar. 14, 2013; entitled "Sine Modified Trapezoidal Drive for Brushless DC Motors," by Ward R. Brown and Howard Hendricks; and is hereby incorporated by reference herein for all purposes.

TECHNICAL FIELD

The present disclosure relates to Brushless direct current (BLDC) motors, and, more particularly, to generating sine modified trapezoidal drive to BLDC motors.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. A more detailed synopsis of BLDC motors may be found in Microchip Application Note AN857, entitled "Brushless DC Motor Control Made Easy;" and Microchip Application Note AN885, entitled "Brushless DC (BLDC) Motor Fundamentals;" both at www.microchip.com, and wherein both are hereby incorporated by reference herein for all purposes.

BLDC motor control provides three things: (1) pulse width modulation (PWM) drive voltages to control the motor speed, (2) a mechanism to commutate the stator of the BLDC motor, and (3) a way to estimate the rotor position of the BLDC motor. PWM may be used to provide a variable voltage to the stator windings of the BLDC motor. The effective voltage provided thereto is proportional to the PWM duty cycle. The inductances of the stator coils act as low pass filters to smooth out the PWM pulses to substantially direct current (DC) voltages. When properly commutated, the torque-speed characteristics of a BLDC motor are substantially identical to a DC motor. The variable voltage controls the speed of the motor and the available torque.

A three-phase BLDC motor completes an electrical cycle, i.e., 360 electrical degrees of rotation, in six steps at 60 electrical degrees per step. Synchronously at every 60 electrical degrees, winding phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs.

BLDC motors are not self-commutating and therefore are more complicated to control. BLDC motor control requires knowledge of the motor rotor position and a mechanism to commutate the BLDC motor stator windings. For closed-loop speed control of a BLDC motor there are two additional requirements, measurement of rotational speed and a pulse width modulation (PWM) drive signal to control the motor speed and power therefrom.

To sense the rotor position of the BLDC motor, Hall Effect sensors may be used to provide absolute rotor position sensing. However, Hall Effect sensors increase the cost and complexity of a BLDC motor. Sensorless BLDC control eliminates the need for Hall Effect sensors by monitoring the back electromotive force (BEMF) voltages at each phase (A-B-C) of the motor to determine drive commutation. The drive commutation is synchronized with the motor when the BEMF of the un-driven phase crosses one-half of the motor supply voltage in the middle of the commutation period. This is referred to as "zero-crossing" where the BEMF varies above and below the zero-crossing voltage over each electrical cycle. Zero-crossing can only be detected on the un-driven phase when the drive voltage is being applied to the driven phases. So detecting a change of the BEMF on the un-driven phase from less than to greater than one-half of the motor supply voltage may be used during application of the drive voltage to the two driven phases for a three phase BLDC motor.

One of the simplest methods of control for a BLDC motor is trapezoidal commutation. Switching (commutation), e.g., using power transistors, energizes the appropriate two stator windings of a three phase BLDC motor depending upon the rotor position. The third winding remains disconnected from the power source. During rotation of the rotor currents, two of the stator winding are equal in magnitude and the third unconnected stator winding current is zero (for a WYE connected stator windings). With a three phase BLDC motor there are only six different space vector directions and as the rotor turns, the current through two of the stator windings (WYE connected stator windings) is electrically switched (commutated) every 60 degrees of electrical rotation so that the current space vector is always within the nearest 30 degrees of the quadrature direction. The current waveform for each winding is therefore a staircase from zero, to positive current, to zero, and then to negative current. This produces a current space vector that approximates smooth rotation as it steps among six distinct directions as the rotor turns. The trapezoidal-current driven BLDC motors are popular because of the simplicity of control but suffer from higher torque ripple and lower efficiency than sinusoidal drive.

Sinusoidal commutation drives the three stator windings of the BLDC motor with three currents that vary smoothly as the rotor turns. The relative phases of these currents are chosen, e.g., 120 degrees apart, so that they provide for a smoothly rotating current space vector that is always in the quadrature direction with respect to the rotor and has constant magnitude. This eliminates the torque ripple and commutation spikes associated with trapezoidal commutation. However, sinusoidal commutation drive systems are more complex and expensive than trapezoidal commutation drive systems.

SUMMARY

Therefore, a need exists to reduce torque ripple and improve efficiency at lower circuit complexity and costs when driving a BLDC motor.

According to an embodiment, a method for modifying trapezoidal drive to a brushless direct current (BLDC) motor may comprise the steps of: starting a commutation drive period; dividing the commutation drive period into N time segments; associating the N time segments into N degree segments, wherein a one of the N degree segments in the middle of the N time segments may be substantially zero (0) degrees; determining cosine values for each of the N degree segments; and modifying a duty cycle of a pulse width modulation (PWM) drive to the BLDC motor with the cosine values at appropriate times during the commutation drive period.

According to a further embodiment of the method, the BLDC motor is three phase and has first, second and third motor terminals. According to a further embodiment of the method, the step of starting the commutation drive period may comprise the steps of: coupling the first motor terminal to a power supply common; coupling the second motor terminal to a power supply voltage controlled by the PWM drive; determining when a back electromotive force (BEMF) voltage may be substantially zero at the third motor terminal, wherein the third motor terminal may not be connected to either the power supply common or voltage; and determine the commutation drive period from a time between the BEMF voltage at substantially zero volts and a previous BEMF voltage at substantially zero volts.

According to a further embodiment of the method, there may be six commutation drive periods of sixty (60) electrical degrees rotation each, and each one of the six commutation drive periods having a different connection configuration of motor terminals. According to a further embodiment of the method, the N degree segments may be from about minus thirty (−30) degrees to about plus thirty (+30) degrees. According to a further embodiment of the method, the duty cycle of the PWM drive may be greatest at a degree segment of zero (0) degrees. According to a further embodiment of the method, the three phase BLDC motor may have three stator pole pair windings. According to a further embodiment of the method, the three stator pole pair windings may be WYE connected. According to a further embodiment of the method, the three stator pole pair windings may be Delta connected. According to a further embodiment of the method, the three phase BLDC motor may have one pole pair winding per phase. According to a further embodiment of the method, the three phase BLDC motor may have at least two pole pair windings per phase. According to a further embodiment of the method, the step of determining cosine values may be done with a microcontroller and a cosine look-up table. According to a further embodiment of the method, the steps of starting a commutation drive period, dividing the commutation drive period into N time segments, associating the N time segments into N degree segments, determining cosine values, and modifying the duty cycle of the PWM drive may be done with a microcontroller.

According to another embodiment, a system for driving a brushless direct current (BLDC) motor with sine modified pulse width modulation (PWM) may comprise: a three phase BLDC motor having first, second and third motor terminals; high and low side power switches coupled to each of the motor terminals, wherein the high and low side power switches may be further coupled between a power supply common and a power supply voltage controlled by the PWM drive, wherein each of the high and low side power switches will connected the respective one of the motor terminals to either the power supply common, voltage or neither; zero crossing voltage detectors, wherein each one of the motor terminals may be connected to a respective one of the zero crossing voltage detectors; a PWM master time base; PWM generators coupled to the PWM master time base and respective ones of the motor terminals; and a microcontroller comprising a cosine lookup table and at least one timer/counter for storing time periods between back electromotive force (BEMF) zero voltage crossings at ones of the motor terminals not connected to either the power supply common or voltage, wherein the zero crossing voltage detectors provide when the BEMF zero voltage crossings occur; wherein the microcontroller generates a sine modified duty cycle PWM control signal to the PWM generators for controlling a duty cycle of the PWM drive therefrom based upon cosine values of rotational degrees associated with the stored time periods between the BEMF zero voltage crossings.

According to a further embodiment, high and low driver pairs may be coupled between the PWM generators and respective ones of the high and low side power switches. According to a further embodiment, the high and low side power switches may comprise high and low side power metal oxide semiconductor field effect transistors (MOSFETs). According to a further embodiment, the duty cycle of the PWM control signal may be greatest at a one-half time of each stored time period.

According to yet another embodiment, a motor controller for providing sine modified pulse width modulation (PWM) drive to a brushless direct current (BLDC) motor may comprise: high and low side power switches coupled to each motor terminal, wherein the high and low side power switches may be further coupled between a power supply common and a power supply voltage controlled by the PWM drive, wherein each of the high and low side power switches will connected the respective one of the motor terminals to either the power supply common, voltage or neither; zero crossing voltage detectors, wherein each one of the motor terminals may be connected to a respective one of the zero crossing voltage detectors; a PWM master time base; PWM generators coupled to the PWM master time base and respective ones of the motor terminals; and a microcontroller comprising a cosine lookup table and at least one timer/counter for storing time periods between back electromotive force (BEMF) zero voltage crossings at ones of the motor terminals not connected to either the power supply common or voltage, wherein the zero crossing voltage detectors provide when the BEMF zero voltage crossings occur; wherein the microcontroller generates a sine modified duty cycle PWM control signal to the PWM generators for controlling a duty cycle of the PWM drive therefrom based upon cosine values of rotational degrees associated with the stored time periods between the BEMF zero voltage crossings. According to a further embodiment, the duty cycle of the PWM control signal may be greatest at a one-half time of each stored time period.

BRIEF DESCRIPTION OF THE DRAWINGS

A more complete understanding of the present disclosure may be acquired by referring to the following description taken in conjunction with the accompanying drawings wherein.

Figure 1:
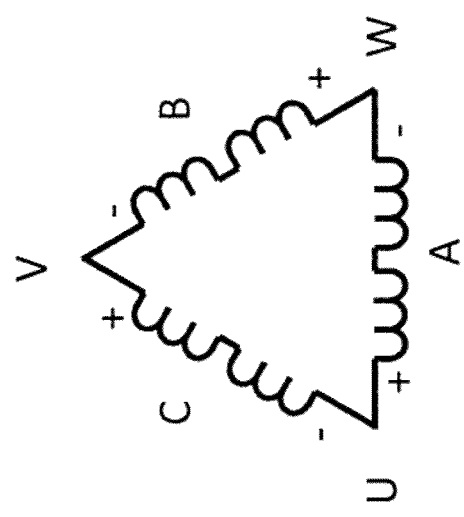
FIG. 1 illustrates schematic diagrams of three phase BLDC motor windings connected in WYE and Delta configurations, according to the teachings of this disclosure.
Figure 1:
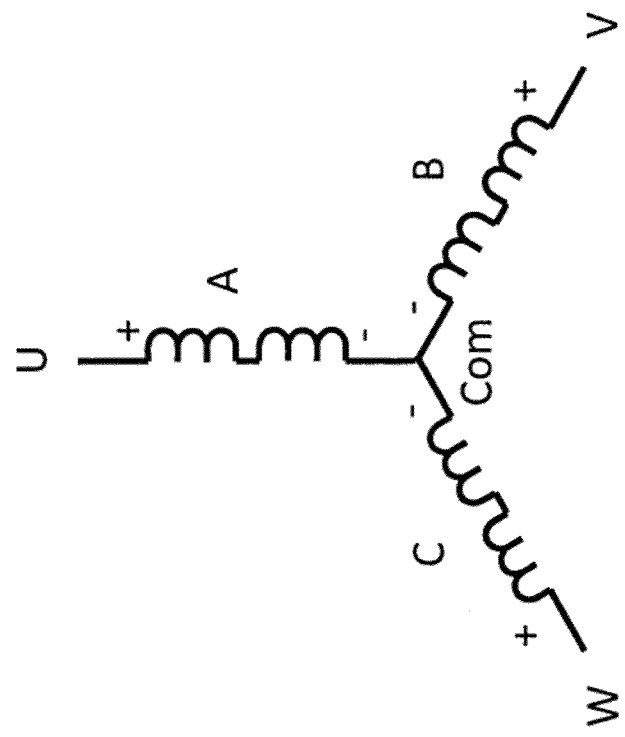

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to embodiments of this disclosure, each drive step of a trapezoidal drive is sine modified so that the applied drive voltage, e.g., PWM, substantially matches the induced voltage of the BLDC motor. This will result in the BLDC motor operating with the best efficiency and lowest torque ripple. This may be accomplished by modifying the normal DC drive, e.g., PWM drive, to a BLDC motor with a small portion of a single phase sine wave, e.g., sine modified PWM duty cycle, on only one motor terminal at a time, e.g., for a three phase BLDC motor a first terminal is connected to a first stator winding and is at power supply common, and a second terminal is driven with the sine modified PWM duty cycle drive voltage. A third terminal of the three phase BLDC motor is left floating, e.g., not connected to either the power supply common or the PWM drive signal. A back electromotive force (BEMF) voltage is measured at the third terminal whenever the PWM drive signal is on to determine the rotational speed of the BLDC motor and determine when to commutate the drive voltage to another motor phase terminal. The three terminal connection relationships change (commutate) for every 60 degrees rotation of the rotor. It is contemplated and within the scope of this disclosure that BLDC motors having more than three phases may also benefit from the teachings of this disclosure.

For a WYE connected three phase BLDC motor the first and second stator windings connected to the first and second terminals are also connected in series, and the third stator winding is connected between the common connection between the first and second stator windings and the third terminal. For a Delta connected three phase BLDC motor the first stator winding is connected between the first and second terminals, the second stator winding is connected between the second and third terminals, and the third stator winding is connected between the third and first terminals. When the first terminal is at the power supply common and the second terminal is driven with the sine modified PWM duty cycle drive voltage, the first stator winding has the full PWM drive signal across it, and the second and third stator windings are connected in series between the first and second terminals and in parallel with the first stator winding. The third terminal is connected between the second and third stator windings and is left floating, e.g., not connected to either the power supply common or the PWM drive signal.

Referring now to the drawing, the details of a specific example embodiment is schematically illustrated. Like elements in the drawings will be represented by like numbers, and similar elements will be represented by like numbers with a different lower case letter suffix.

Figure 2:
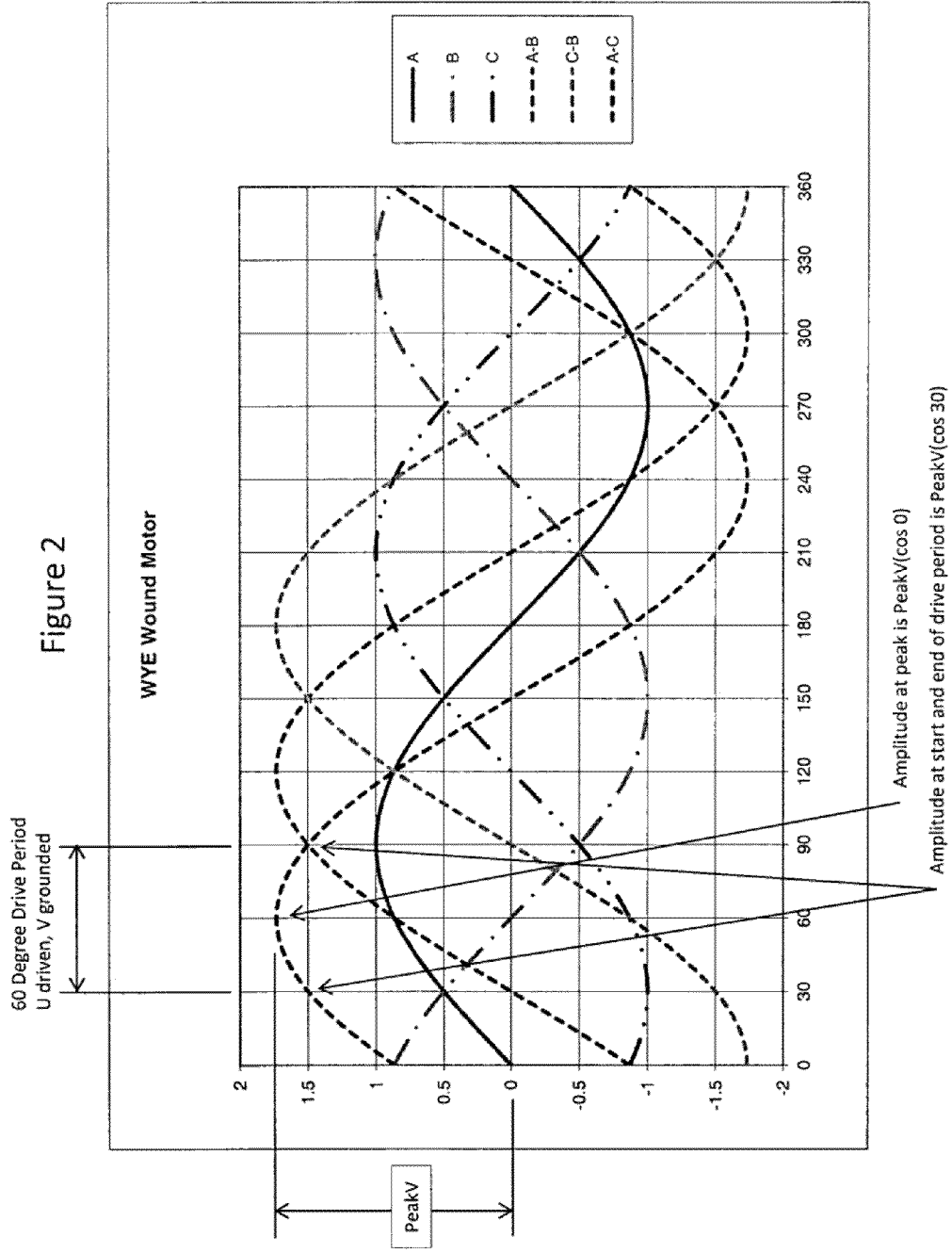
FIG. 2 illustrates a schematic waveform graph of the operation of a WYE winding configured three phase BLDC motor, according to the teachings of this disclosure.

Referring to FIG. 1, depicted are schematic diagrams of three phase BLDC motor windings connected in WYE and Delta configurations, according to the teachings of this disclosure. Referring to FIG. 2, depicted is a schematic waveform graph of the operation of a WYE winding configured three phase BLDC motor, according to the teachings of this disclosure. The waveforms shown in FIG. 2, identified as "A," "B" and "C" are the voltages induced by the respective A, B and C stator winding coils (FIG. 1) moving in the presence of a permanent magnetic field. The waveforms identified as A-B, C-B and A-C are the respective induced voltages at terminals U relative to V, W relative to V, and U relative to W.

Figure 3:
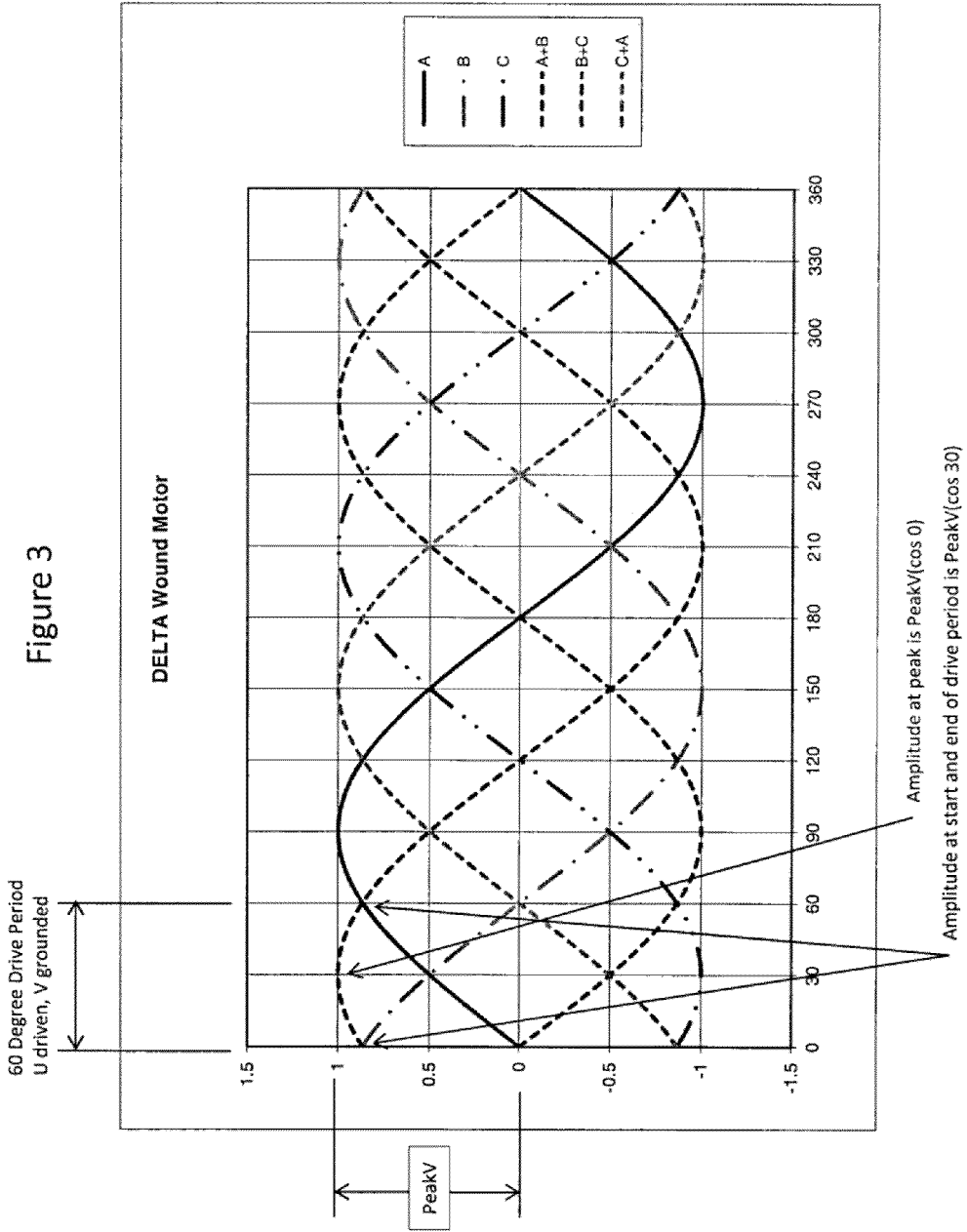
FIG. 3 illustrates a schematic waveform graph of a Delta winding configured three phase BLDC motor, according to the teachings of this disclosure.

Referring to FIG. 3, depicted is a schematic waveform graph of a Delta winding configured three phase BLDC motor, according to the teachings of this disclosure. The waveforms shown in FIG. 3, identified as "A," "B" and "C" are the voltages induced by the respective A, B and C winding coils (FIG. 1) moving in the presence of a permanent magnetic field. The waveforms identified as A+B, B+C and C+A are the respective induced voltages at terminals U relative to V, W relative to U, and V relative to W. In both the WYE and Delta configurations the three phase BLDC motor will operate with the best efficiency and lowest torque ripple when the applied voltage substantially matches the induced winding voltage.

Figure 4:
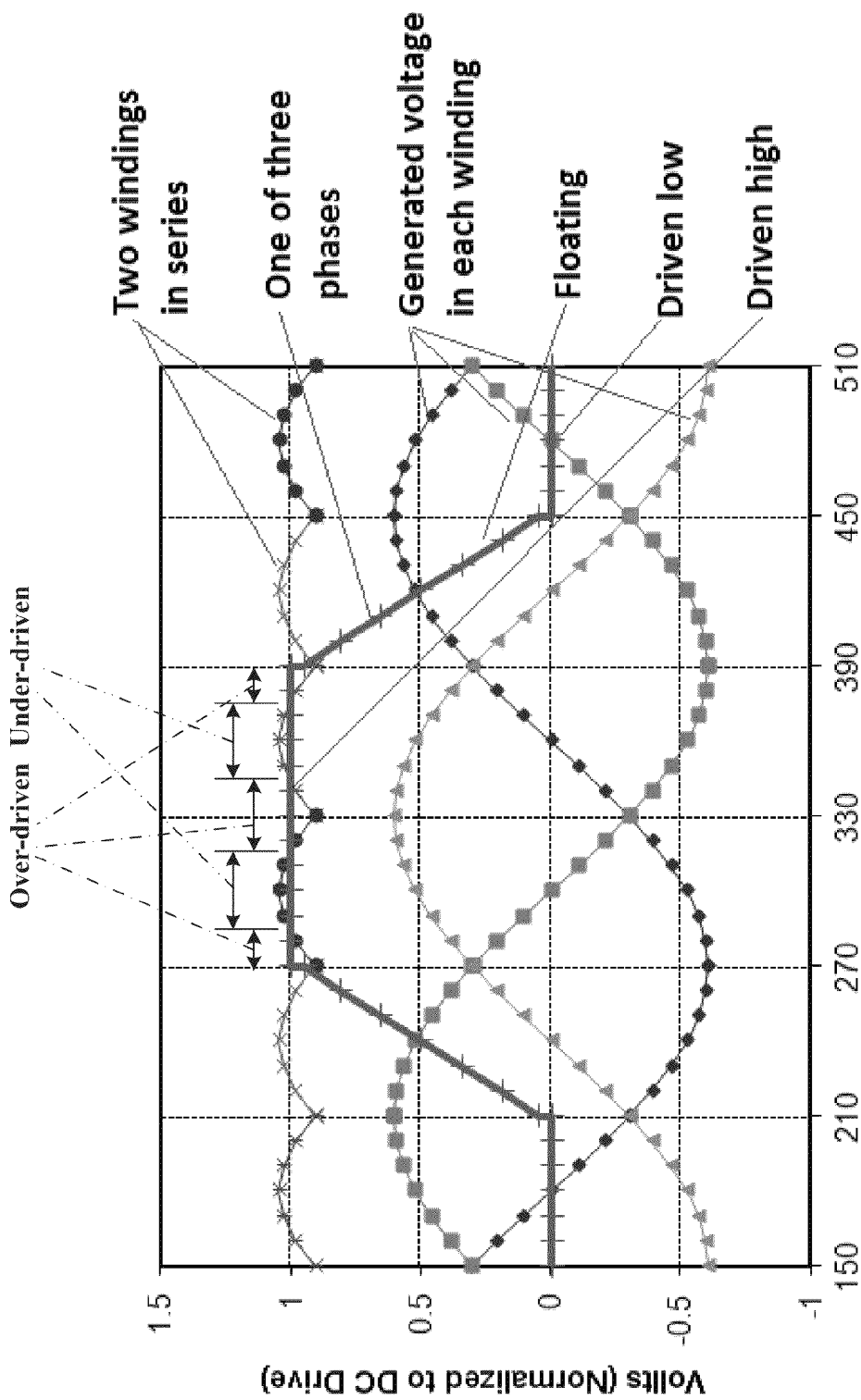
FIG. 4 illustrates a schematic waveform graph of trapezoidal drive to a three phase BLDC motor, according to the teachings of this disclosure.

Referring to FIG. 4, depicted is a schematic waveform graph of trapezoidal drive to a three phase BLDC motor, according to the teachings of this disclosure. The stator winding terminal not driven, i.e., floating, comprises a trapezoidal voltage waveform that varies from substantially zero (0) volts to the motor voltage and is used in determining the BEMF zero cross sensorless rotor position determinations for the 60 degree commutations, as more fully described in Microchip Application Note AN885, entitled "Brushless DC (BLDC) Motor Fundamentals;" at www.microchip.com, and is hereby incorporated by reference herein for all purposes. The stator winding voltages are phase shifted in time by 120 electrical degrees, and the sum of the voltages across two series connected stator windings are shown as the top waveform varying slightly above and below the motor drive voltage every 60 electrical degrees. Note the portions of this waveform when it is less than or greater than the trapezoidal waveform (BEMF) of the floating terminal connected to the third stator winding not driven. When the trapezoidal waveform is greater than the voltage across the two series connected stator windings are "over-driven," and when the trapezoidal waveform is less than the voltage across the two series connected stator winding are "under-driven."

Figure 5:
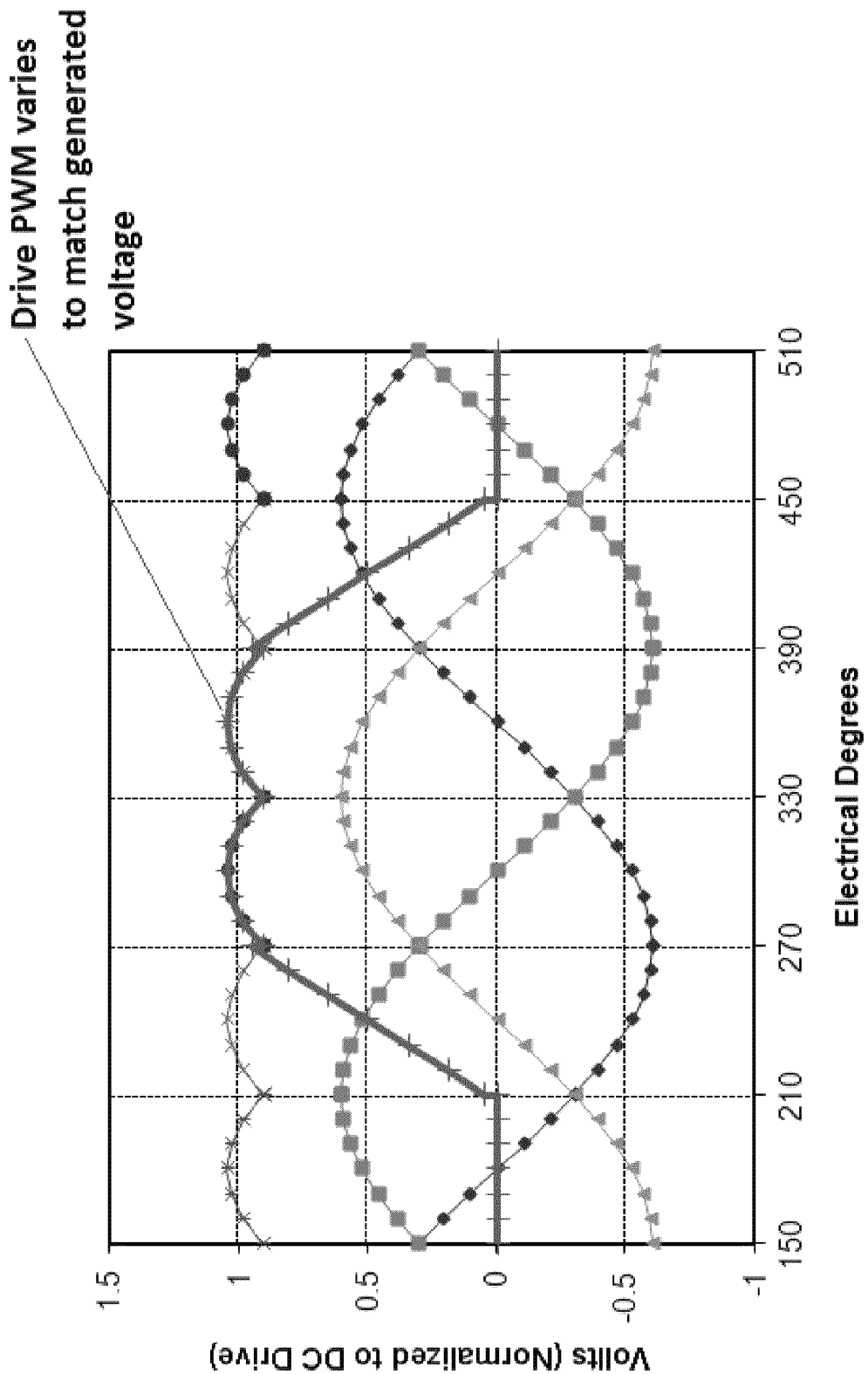
FIG. 5 illustrates a schematic waveform graph of sine modified drive to a BLDC motor, according to a specific example embodiment of this disclosure.

Referring to FIG. 5, depicted is a schematic waveform graph of sine modified drive to a BLDC motor, according to a specific example embodiment of this disclosure. According to the teachings of this disclosure, the duty cycle of the PWM drive to the two series connected stator winding (WYE connected stator windings) or one driven coil (Delta connected stator windings) may be varied to substantially match the generated BEMF voltage measured at the third winding not driven as shown in the resulting top waveform of FIG. 5. This may be accomplished by varying the duty cycle of the pulse width modulated (PWM) drive signal, wherein an increase in drive voltage results from an increase in the PWM duty cycle and a decrease in the drive voltage results from a decrease in the PWM duty cycle. Therefore the sine modified duty cycle of the PWM drive signal may be determined with the rotor position in degrees and a cosine function, e.g., from a cosine lookup table using the rotor position degrees, as more fully explained hereinafter.

The PWM duty cycle determines the speed of the BLDC motor, e.g., for full speed the PWM duty cycle would be about 100 percent and for half-speed the PWM duty cycle would be about 50 percent. Commutation times may be determined by the times between when the BEMF at each of the unconnected terminals are at "zero volts" e.g., substantially equal to the voltage at the common point of a WYE stator winding connected BLDC motor or about one-half the drive voltage. In a BLDC motor controller using a microcontroller, the microcontroller may program a timer/counter to represent the time between BEMF zero crossings and to be used in determining when to commutate the BLDC motor terminals to the next 60 electrical degree drive winding configuration (for three phase BLDC motor). When the time between BEMF zero crossings changes the microcontroller will also change the timer/counter count value to properly represent the new rotational speed of the BLDC motor. This count value may be used to interpolate a set of PWM duty cycle modifiers over a 60 electrical degree drive period.

For example, the duty cycle of the PWM pulse widths are greatest in the middle of the drive period, concurrent with the peak of the induced voltage, and are reduced by the cosine of the angle at each point in the drive period, wherein the angle at the center (e.g., shown in FIG. 5 at 300 degrees) is defined to be zero (0) degrees, the angle at the beginning of the drive period (e.g., shown in FIG. 5 at 270 degrees) of approximately minus thirty (−30) degrees, and at the end of the drive period (e.g., shown in FIG. 5 at 330 degrees) of approximately plus thirty (+30) degrees. The values of the cosine of the angles between about −30 degrees and about +30 degrees may be used to modify the duty cycle of the PWM drive signal dependent upon the rotor angular positions determined from the timer/counter count values that are representative of the times between the zero crossing BEMF voltages measured at the unconnected motor terminals.

Figure 6:
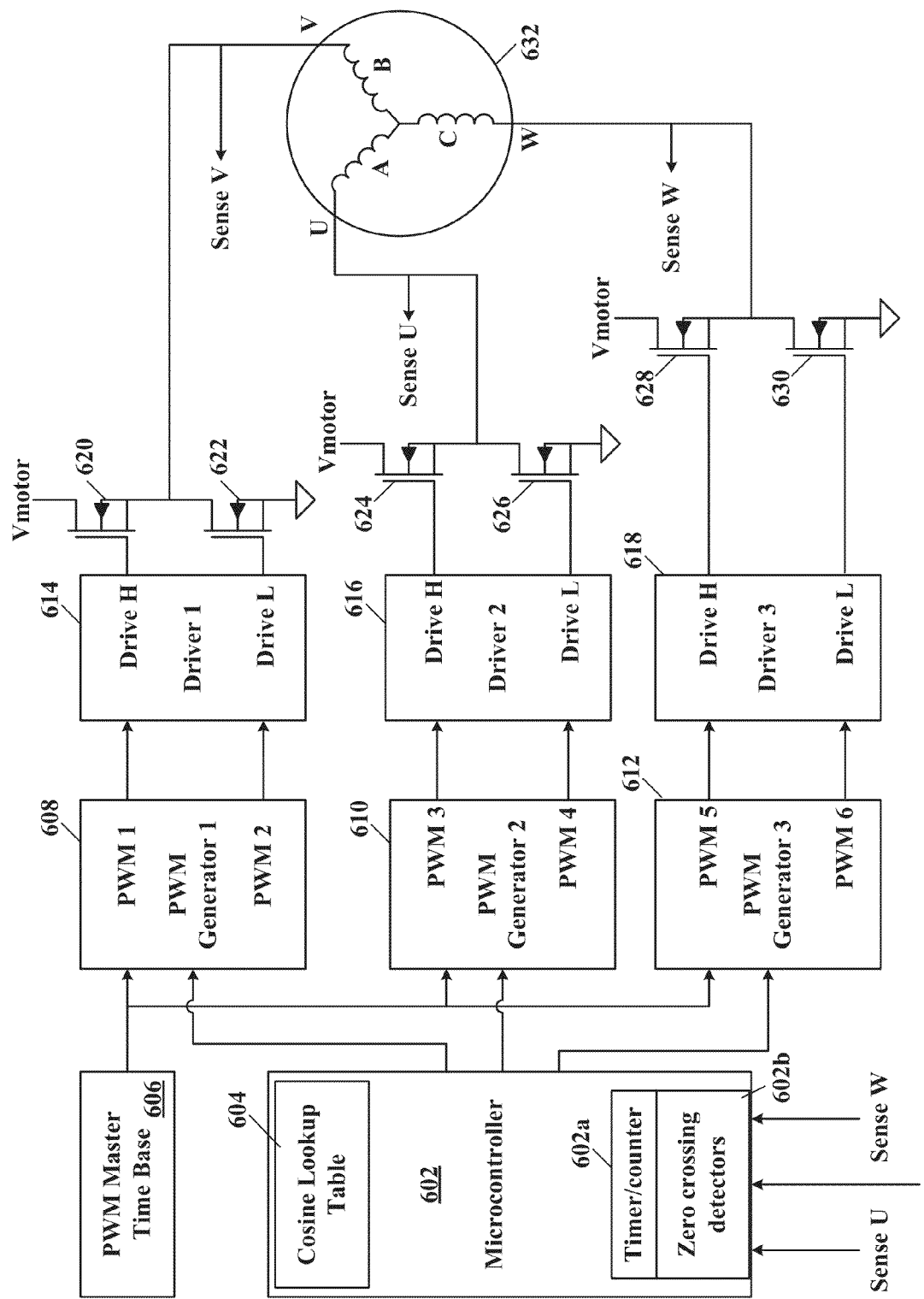
FIG. 6 illustrates a schematic block diagram of a BLDC motor controller-driver, according to a specific example embodiment of this disclosure.

Referring to FIG. 6, depicted is a schematic block diagram of a BLDC motor controller-driver, according to a specific example embodiment of this disclosure. A three phase BLDC motor 632 may be driven by three sets of power switches 620-630, e.g., power metal oxide semiconductor (MOSFET) transistors, that alternately couples the motor terminals, U, V or W; to a power supply common, a power supply voltage, Vmotor; or allows a motor terminal to "float," i.e., not connected to either power supply common or voltage. These power switches 620-630 may be driven by high/low drivers 614-618. The high/low drivers 614-618 may be coupled to PWM generators 608-612 that may receive a master clock signal from a PWM master time base 606. Duty cycle control of the PWM signals from the PWM generators 608-612 may be provided by a microcontroller 602 that may also be coupled to a cosine lookup table 604. The microcontroller 602 may also monitor the voltages at each stator winding terminal, U, V and W, e.g., zero crossing detectors 602b, for rotor position indication based upon BEMF voltage zero crossings. A timer/counter 602a may be programmed with the time determined between BEMF voltage zero crossings and updated when the time between BEMF voltage zero crossing changes.

Knowing the position of the rotor, e.g., based upon the commutation time count in the timer/counter 602a, the microcontroller may "adjust" the duty cycle of the PWM drive signal so that the applied drive voltage, e.g., PWM duty cycle, and the induced voltage are substantially the same, thereby reducing torque ripple and improving efficiency of the BLDC motor 632. The duty cycle of the PWM drive signal may be modified based upon the cosine of the angle at each point in the drive period where the angle at the center is defined to be 0 degrees (cosine 0=1), wherein the start of the drive period may be about −30 degrees and the end of the drive period may be about +30 degrees. Therefore the PWM duty cycle may be modified according to the cosine values from about −30 degrees to about +30 degrees where the PWM duty cycle is greatest (highest resulting drive voltage) at zero (0) degrees, resulting in a drive voltage waveform substantially the same as the BLDC motor induced voltage. The microcontroller 602 may synthesize the cosine values for modifying the PWM duty cycle by using the timer/counter 602a count increments, representing degrees of rotation from about −30 degrees to about +30 degrees, then looking up the cosine values of the rotation degrees associated with each count increment in the cosine lookup table 604. These cosine values may be applied to sine modify the PWM drive duty cycle, according to the teachings of this disclosure. The microcontroller, alternatively, may calculate the cosine values based upon the equivalent degrees represented by the count increments.

Figure 7:
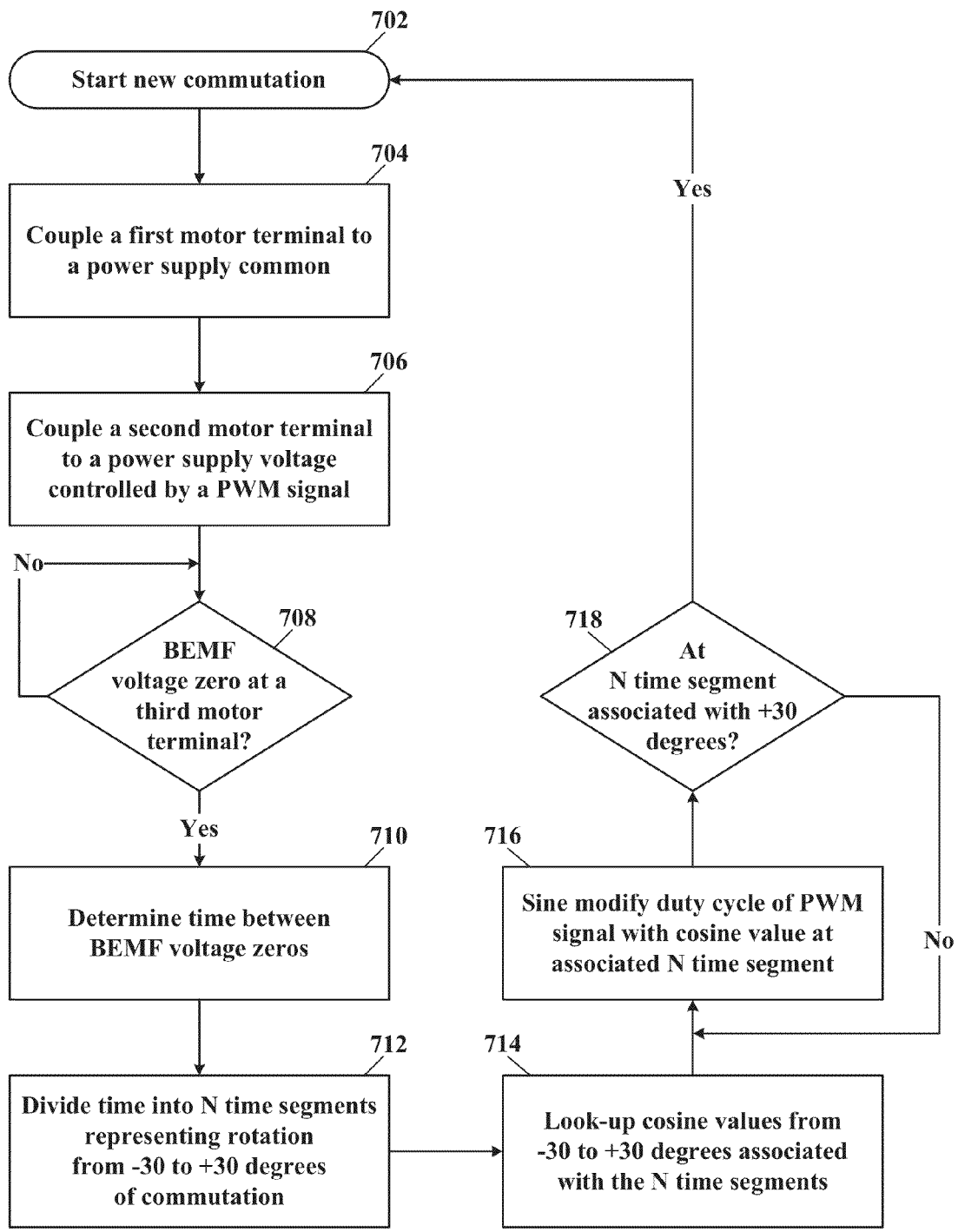
FIG. 7 illustrates a schematic operational flow diagram of a BLDC motor controller-driver, according to a specific embodiment of this disclosure.

Referring to FIG. 7, depicted is a schematic operational flow diagram of a BLDC motor controller-driver, according to a specific embodiment of this disclosure. In step 702 a new commutation period begins. In step 704 a first motor terminal is coupled to a power supply common, e.g., though a low side transistor switch 622, 626 or 630. The first motor terminal may remain coupled to the power supply common during the entire commutation period. In step 706 a second motor terminal is coupled to a PWM drive signal, e.g., through high side transistor switch 624, 628, or 620. The duty cycle of the PWM drive signal is used to control the speed of the BLDC motor 632. In step 708 a third motor terminal is monitored to determine when a BEMF voltage is at substantially a zero voltage crossing, e.g., voltage at a common of the WYE winding connected motor, or one-half motor supply voltage.

In step 710 a time between the present BEMF zero voltage crossing and a previous BEMF zero voltage crossing is determined which establishes a commutation drive time period of the BLDC motor representative of its rotation speed. In step 712 the determined commutation drive time period may be divided into N time segments representing rotation of the motor from about −30 degree to about +30 degrees that also represents one commutation time period. In step 714 these N time segments may be used to look up the cosine values of the associated rotational degrees from −30 degrees to +30 degrees. Alternatively, the microcontroller 602 may convert the N time segments into degree segments, e.g., ranges of degrees depending upon granularity desired, from about −30 degrees to about +30 degrees and then calculate the cosine values for each degree segment. In step 716 cosine values of the respective degrees of rotation during the commutation N time segments are used to sine modify the duty cycle of the PWM drive signal. Step 718 determines when the commutation time period has ended at about +30 degrees of rotation, i.e., commutation time period is defined as a 60 degree rotation from about −30 degrees to about +30 degrees. At the end of the commutation time period a new commutation and commutation time period begin at step 702.

It is contemplated and within the scope of this disclosure that sine modifying the duty cycle of the PWM drive signal during commutation periods may also be appropriately applied to one, two and more than three phase BLDC motors. One having ordinary skill in BLDC motor drive design and the benefit of this disclosure could readily implement such applications without undue experimentation.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for modifying trapezoidal drive to a brushless direct current (BLDC) motor, said method comprising the steps of:
   starting a commutation drive period;
   dividing the commutation drive period into N time segments;
   associating the N time segments into N degree segments, wherein a one of the N degree segments in the middle of the N time segments is substantially zero (0) degrees;
   determining cosine values for each of the N degree segments; and
   modifying a duty cycle of a pulse width modulation (PWM) drive to the BLDC motor with the cosine values at appropriate times during the commutation drive period.

2. The method according to claim 1, wherein the BLDC motor is three phase and has first, second and third motor terminals.

3. The method according to claim 2, wherein the step of starting the commutation drive period comprises the steps of:
   coupling the first motor terminal to a power supply common;
   coupling the second motor terminal to a power supply voltage controlled by the PWM drive;
   determining when a back electromotive force (BEMF) voltage is substantially zero at the third motor terminal, wherein the third motor terminal is not connected to either the power supply common or voltage; and
   determine the commutation drive period from a time between the BEMF voltage at substantially zero volts and a previous BEMF voltage at substantially zero volts.

4. The method according to claim 2, wherein there are six commutation drive periods of sixty (60) electrical degrees rotation each, and each one of the six commutation drive periods having a different connection configuration of motor terminals.

5. The method according to claim 2, wherein the N degree segments are from about minus thirty (−30) degrees to about plus thirty (+30) degrees.

6. The method according to claim 5, wherein the duty cycle of the PWM drive is greatest at a degree segment of zero (0) degrees.

7. The method according to claim 2, wherein the three phase BLDC motor has three stator pole pair windings.

8. The method according to claim 7, wherein the three stator pole pair windings are WYE connected.

9. The method according to claim 7, wherein the three stator pole pair windings are Delta connected.

10. The method according to claim 2, wherein the three phase BLDC motor has one pole pair winding per phase.

11. The method according to claim 2, wherein the three phase BLDC motor has at least two pole pair windings per phase.

12. The method according to claim 1, wherein the step of determining cosine values is done with a microcontroller and a cosine look-up table.

13. The method according to claim 1, wherein the steps of starting a commutation drive period, dividing the commutation drive period into N time segments, associating the N time segments into N degree segments, determining cosine values, and modifying the duty cycle of the PWM drive are done with a microcontroller.

14. A system for driving a brushless direct current (BLDC) motor with sine modified pulse width modulation (PWM), said system comprising:
   a three phase BLDC motor having first, second and third motor terminals;
   high and low side power switches coupled to each of the motor terminals, wherein the high and low side power switches are further coupled between a power supply common and a power supply voltage controlled by the PWM drive, wherein each of the high and low side power switches will connected the respective one of the motor terminals to either the power supply common, voltage or neither;
   zero crossing voltage detectors, wherein each one of the motor terminals is connected to a respective one of the zero crossing voltage detectors;
   a PWM master time base;
   PWM generators coupled to the PWM master time base and respective ones of the motor terminals; and
   a microcontroller comprising a cosine lookup table and at least one timer/counter for storing time periods between back electromotive force (BEMF) zero voltage crossings at ones of the motor terminals not connected to either the power supply common or voltage, wherein the zero crossing voltage detectors provide when the BEMF zero voltage crossings occur;
   wherein the microcontroller generates a sine modified duty cycle PWM control signal to the PWM generators for controlling a duty cycle of the PWM drive therefrom based upon cosine values of rotational degrees associated with the stored time periods between the BEMF zero voltage crossings.

15. The system according to claim 14, further comprising high and low driver pairs coupled between the PWM generators and respective ones of the high and low side power switches.

16. The system according to claim 14, wherein the high and low side power switches comprise high and low side power metal oxide semiconductor field effect transistors (MOSFETs).

17. The system according to claim 14, wherein the duty cycle of the PWM control signal is greatest at a one-half time of each stored time period.

18. A motor controller for providing sine modified pulse width modulation (PWM) drive to a brushless direct current (BLDC) motor, comprising:
   high and low side power switches coupled to each motor terminal, wherein the high and low side power switches are further coupled between a power supply common and a power supply voltage controlled by the PWM drive, wherein each of the high and low side power switches will connected the respective one of the motor terminals to either the power supply common, voltage or neither;
   zero crossing voltage detectors, wherein each one of the motor terminals is connected to a respective one of the zero crossing voltage detectors;
   a PWM master time base;
   PWM generators coupled to the PWM master time base and respective ones of the motor terminals; and
   a microcontroller comprising a cosine lookup table and at least one timer/counter for storing time periods between back electromotive force (BEMF) zero voltage crossings at ones of the motor terminals not connected to either the power supply common or voltage, wherein the zero crossing voltage detectors provide when the BEMF zero voltage crossings occur;

wherein the microcontroller generates a sine modified duty cycle PWM control signal to the PWM generators for controlling a duty cycle of the PWM drive therefrom based upon cosine values of rotational degrees associated with the stored time periods between the BEMF zero voltage crossings.

19. The motor controller according to claim 18, wherein the duty cycle of the PWM control signal is greatest at a one-half time of each stored time period.

* * * * *